United States Patent
Dias (10) Patent No.: US 11,451,133 B2
(45) Date of Patent: Sep. 20, 2022

(54) CONTROL UNIT FOR A CONVERTER CIRCUIT WITH MULTIPLE SWITCHING CONVERTER BLOCKS

(71) Applicant: Dialog Semiconductor (UK) Limited, London (GB)

(72) Inventor: Nuno Dias, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 47 days.

(21) Appl. No.: 16/372,884

(22) Filed: Apr. 2, 2019

(65) Prior Publication Data

US 2020/0204059 A1   Jun. 25, 2020

(30) Foreign Application Priority Data

Dec. 19, 2018 (DE) .......................... 102018222290.8

(51) Int. Cl.
*H02M 1/14* (2006.01)
*H02M 3/158* (2006.01)

(52) U.S. Cl.
CPC ......... *H02M 1/143* (2013.01); *H02M 3/1582* (2013.01)

(58) Field of Classification Search
CPC ....... H02M 2003/1552; H02M 3/1582; H02M 3/1584; H02M 1/143
USPC .......................................................... 363/50
See application file for complete search history.

(56) References Cited

U.S. PATENT DOCUMENTS

| | | | |
|---|---|---|---|
| 8,803,498 B2 | 8/2014 | Hunt et al. | |
| 2013/0063984 A1* | 3/2013 | Sandner | H02M 1/38 363/20 |
| 2016/0141960 A1* | 5/2016 | Huang | H02M 3/158 363/21.03 |
| 2016/0190943 A1* | 6/2016 | Chen | H02M 3/33576 363/21.06 |
| 2017/0222464 A1* | 8/2017 | Pullen | H02J 7/0072 |
| 2020/0007035 A1* | 1/2020 | Mehdi | H02M 1/44 |
| 2020/0019434 A1* | 1/2020 | Chang | G06F 9/4881 |

OTHER PUBLICATIONS

German Office Action, File No. 10 2018 222 290.8, Applicant: Dialog Semiconductor (UK) Limited, dated Sep. 28, 2020, 8 pages.

* cited by examiner

*Primary Examiner* — Yemane Mehari (74) *Attorney, Agent, or Firm* — Saile Ackerman LLC; Stephen B. Ackerman (57) ABSTRACT

The present document describes a control unit for a converter circuit comprising a plurality of converter blocks, wherein each converter block comprises one or more switches which are turned on or off during switching events, and wherein at least some of the converter blocks share a common supply rail. The control unit is configured to determine that a first converter block from the plurality of converter blocks requests a switching event at a first time instant. Furthermore, the control unit is configured to determine whether a second converter block from the plurality of converter blocks, with which the first converter block shares a common supply rail, has a reserved switching time slot for a switching event at the first time instant. In addition, the control unit is configured to delay the switching event of the first converter block to a time instant subsequent to the reserved switching time slot, if it is determined that the second converter block has a reserved switching time slot at the first time instant.

19 Claims, 5 Drawing Sheets

CONTROL UNIT FOR A CONVERTER CIRCUIT WITH MULTIPLE SWITCHING CONVERTER BLOCKS

TECHNICAL FIELD

The present document relates to switching converters. In particular, the present document relates to controlling operation of a circuit, notably an integrated circuit, comprising multiple switching converters or converter phases.

BACKGROUND

Switching converters such as buck, boost, buck-boost and other types of switching converters typically generate significant noise at switching events. This noise is typically associated with under- or over-voltage events which are created on the power or supply rails due to the presence of parasitic elements (mainly parasitic inductances and/or parasitic resistances) and/or due to the relatively high level of currents through the switches and/or due to the relatively fast and frequent switching events of the converters to maintain regulation.

At each switching event energy is transferred between parasitic elements thereby causing a relatively fast voltage variation on the power or supply rails. This voltage variation introduces noise and causes stress to the power switches, which may gradually and/or permanently change the characteristics of the power switches. Furthermore, the generated noise may cause interference with other circuits and may disrupt operation of the other circuits (e.g. other switching converters). Hence, the noise and stress caused by switching events may lead to a degradation of the performance of switching converters.

SUMMARY

The present document addresses the technical problem of reducing the stress caused by switching events of switching converters, notably in order to reduce crosstalk, to increase the lifetime of the switching converters and/or to achieve an increased integration level.

According to an aspect, a control unit for a converter circuit comprising a plurality of converter blocks is described. Each converter block comprises one or more switches which are turned on or off during switching events, wherein at least some of the converter blocks share a common supply rail (also referred to as power rail), from or to which the one or more switches may draw or sink current.

The control unit may be configured to determine that a first converter block from the plurality of converter blocks requests a switching event at a first time instant. Furthermore, the control unit may be configured to determine whether a second converter block from the plurality of converter blocks, with which the first converter block shares a common supply rail, has a reserved switching time slot for a switching event at the first time instant. In addition, the control unit may be configured to delay the switching event of the first converter block to a time instant subsequent to the reserved switching time slot, if it is determined that the second converter block has a reserved switching time slot at the first time instant.

According to a further aspect, a converter circuit comprising the control circuit described in the present document is described.

According to a further aspect, a method for controlling a converter circuit comprising a plurality of converter blocks is described, wherein each converter block comprises one or more switches which are turned on or off during switching events. At least some of the converter blocks share a common supply or power rail.

The method comprises determining that a first converter block from the plurality of converter blocks requests a switching event at a first time instant. In addition, the method comprises determining whether a second converter block from the plurality of converter blocks, with which the first converter block shares a common supply rail, has a reserved switching time slot for a switching event at the first time instant. In addition, the method comprises delaying the switching event of the first converter block to a time instant subsequent to the reserved switching time slot, if it is determined that the second converter block has a reserved switching time slot at the first time instant.

According to a further aspect, a software or hard coded program is described. The program may be adapted for execution on a processor or executed by customized logic hardware and for performing the method steps outlined in the present document when carried out.

According to another aspect, a storage medium is described. The storage medium may comprise a software program adapted for execution on a processor or customized logic and for performing the method steps outlined in the present document when carried out.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings.

DETAILED DESCRIPTION

Figure 1:
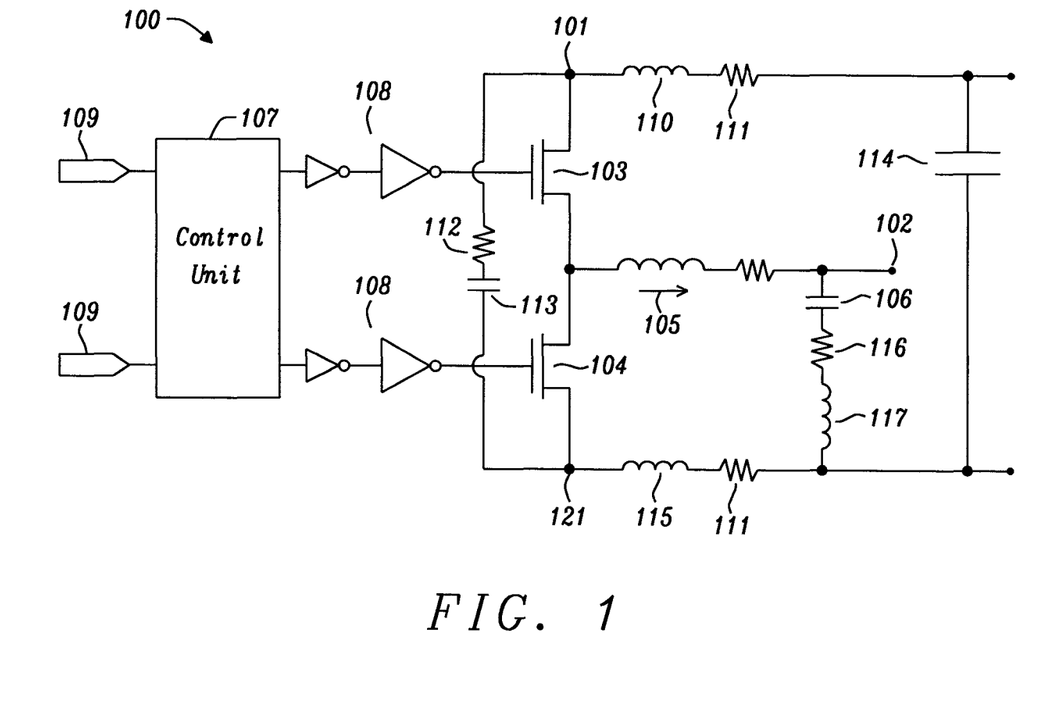
FIG. 1 shows an example switching converter.

As outlined above, the present document is directed at decreasing the stress caused by the switching events of switching converters. FIG. 1 shows an example switching converter 100 with a high side power switch 103 and a low side power switch 104, which are arranged between a rail at a supply voltage 101 and a rail at a reference voltage 121 (e.g. ground). The switching converter 100 is configured to provide an output voltage 102 based on the supply voltage 101 via an inductor 105, wherein the output voltage 102 may be provided at an output capacitor 106. The switches 103, 104 are driven using driver circuits 108 and a control unit 107 based on one or more control signals 109. In particular, the switches 103, 104 may be operated in order to regulate the output voltage 102 to a given target voltage and/or to regulate the output current to a given target current. The time instants for switching events of the switches 103, 104 may be set in dependence of the regulation or control scheme.

FIG. 1 also shows various parasitic elements, such as a parasitic inductance 110 and a parasitic resistance 111 of the rail for the supply voltage 101, and a parasitic inductance 115 and a parasitic resistance 111 of the rail for the reference voltage 121. Furthermore, FIG. 1 illustrates further parasitic elements 112, 113, 114, 116, 117.

Figure 2A:
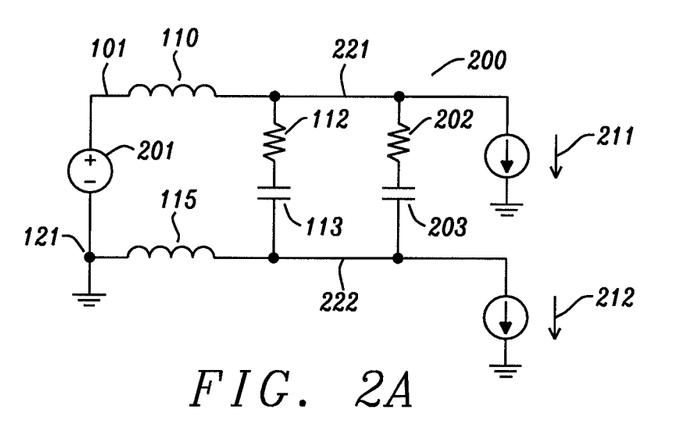
FIG. 2B shows example variations of rail voltages caused by switching events in FIG. 2A.

At each switching edge (also referred to as switching event) of a converter block (also referred to as a phase), the energy accumulated in the parasitic elements 110, 115 is transferred. This energy transfer causes supply variation. FIG. 2A illustrates a simplified example 200 of this principle using the switching sequence of the output stage of a buck converter 100. At turn off of the high side switch 103, the differential supply (voltage 221 compared to voltage 222) increases momentarily (see diagram 251) and the opposite occurs at turn on of the high side switch 103 (see diagram 252). Furthermore, it is shown that the current 211 through the high side switch 103 decreases at a turn off of the high side switch 103 and increases at a turn on of the low side switch 104. In addition, it is shown that the current 212 through the low side switch 103 increases at a turn off of the high side switch 103 and decreases at a turn on of the low side switch 104.

FIG. 2A also shows a voltage source 201 and parasitic elements 112, 113, 202, 203. In addition, FIG. 2B illustrates the duration 241 of a switching event.

The energy associated with a switching event is proportional to the square of the current 211, 212 through the inductor 105. This means that if another converter block is connected to the same rail at the supply voltage 221 and/or to the same rail at the reference voltage 222 with the same current level, and switches at the same time, the energy associated with the simultaneous switching events may be increased by a factor four. This increased energy may be sufficient to cause permanent damage to a converter block, depending on the supply conditions and characteristic of the power switches 103, 104.

Figure 2B:
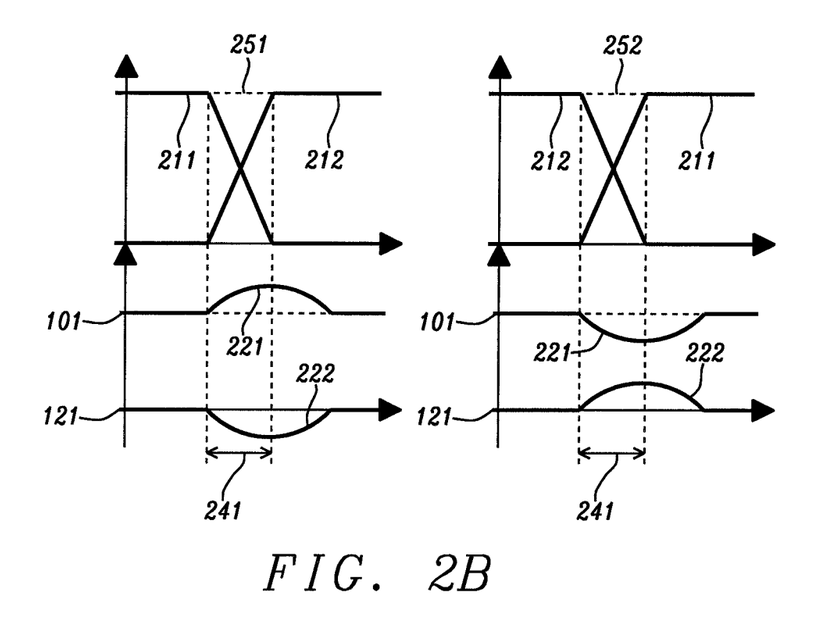

In terms of voltage variation on a rail of FIG. 2A, simultaneous switching events with the same energy as depicted in FIG. 2B would cause the supply variation to double. In case of a turn off of the high side switch 103 (reference sign 251), the increase of the supply voltage 221 would cause a substantial overvoltage stress which could lead to damage of some devices in a power converter 100. In case of a turn on of the high side switch 103 (reference sign 252), the decrease of the supply voltage 221 could lead to an unexpected turn off of a block or circuit powered from the same rail.

Figure 3:
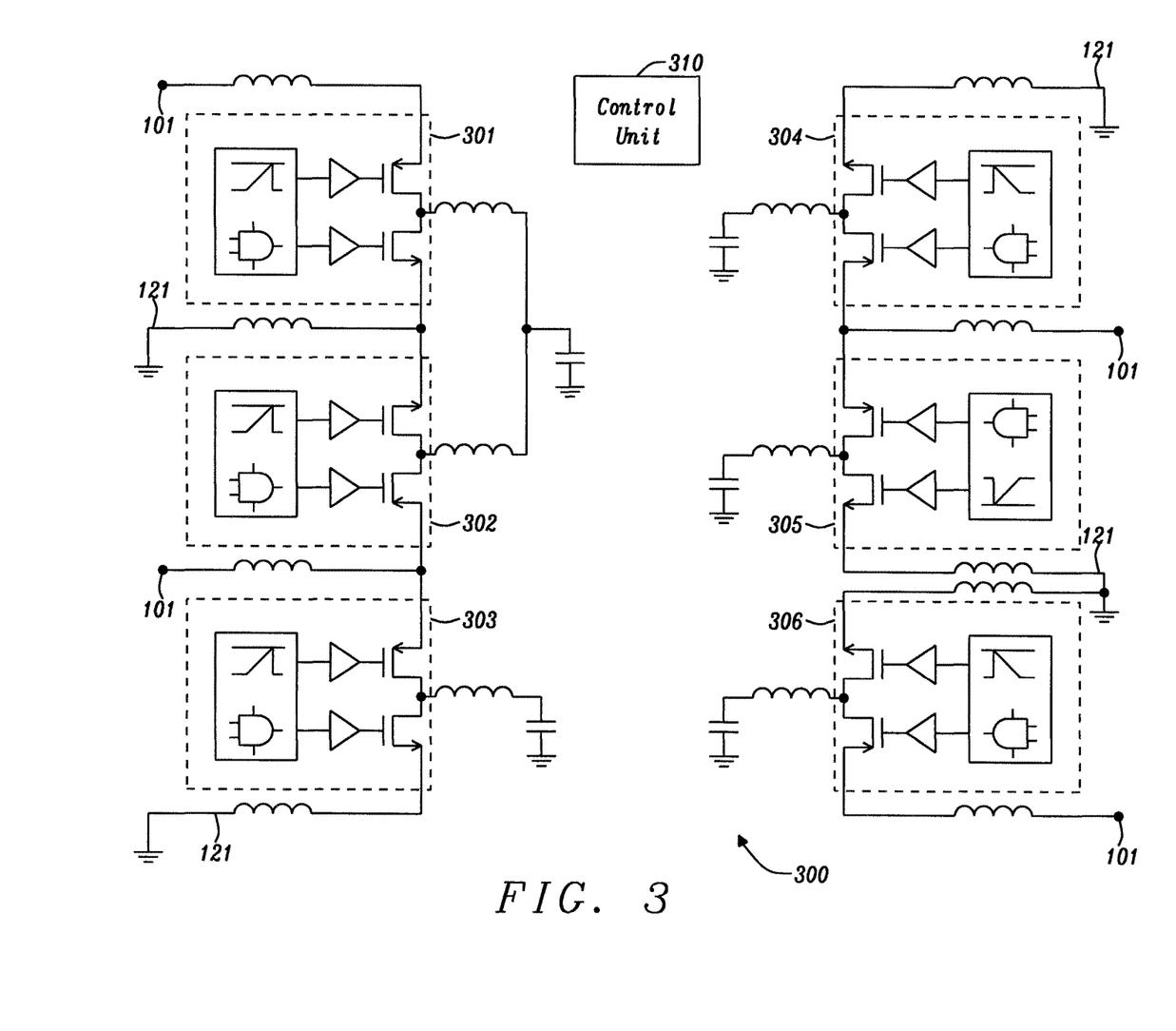
FIG. 3 shows an example converter circuit comprising a plurality of converter blocks.

FIG. 3 shows an example converter circuit 300 with a plurality of converter blocks 301, 302, 303, 304, 305, 306, wherein each converter block may comprise a switching converter 100. The different converter blocks may share common rails. As can be seen from FIG. 3, blocks 301 and 302 share the rail to the reference voltage 121;
blocks 302 and 303 share the rail to the supply voltage 101; and
blocks 304 and 305 share the rail to the reference voltage 101.

Based on these dependencies, the dependency map shown in Table 1 may be provided for the circuit 300 of FIG. 3 (wherein "Y" indicates a dependency and wherein "N" indicates that there is no dependency).

TABLE 1

| Switching slot dependency | Block 301 | Block 302 | Block 303 | Block 304 | Block 305 | Block 306 |
|---|---|---|---|---|---|---|
| Block 301 | N | Y | N | N | N | N |
| Block 302 | Y | N | Y | N | N | N |
| Block 303 | N | Y | N | N | N | N |
| Block 304 | N | N | N | N | Y | N |
| Block 305 | N | N | N | Y | N | N |
| Block 306 | N | N | N | N | N | N |

A control unit 310 of the circuit 300 may be configured provide a switching arbitration control scheme between the power switches 103, 104 of the different converter blocks 301, 302, 303, 304, 305, 306 by adding a time margin between switching events of dependent converter blocks, i.e. of converter blocks that share the same parasitics 110, 115 on a common rail. By adding a time margin, cross disturbance and stress may be reduced and/or avoided.

At each switching edge (i.e. switching event) requested by a power switch 103, 104, the switching permission may be withheld for a certain time, also referred to as a switching time slot, until a previous switching event of a dependent converter block is finalized. If the switching events of the dependent converter blocks are sufficiently apart in time such that no crosstalk occurs (i.e. a previous switching time slot expires before another related switching edge occurs), the permission for switching may be granted immediately.

The arbitration of the switching time slots is preferably selective and (only) applies to related or dependent power switches 103, 104 (i.e. power switches 103, 104 which share a common rail) in order to minimize time or delay overhead. The time or delay overhead, which may be caused by arbitration may cause relatively small jitter and/or noise, which typically does not affect operation of the converter blocks 301-306. The arbitration allows reducing the stress which is generated by switching events. Furthermore, the arbitration reduces the risk of permanent damage and/or degradation caused by overvoltage stress. In addition, the arbitration allows for reduced voltage variations on the rails, thereby reducing crosstalk between the related converter blocks 301-306 or power switches 103, 104.

A switching event usually has a duration 241 of approximately 1-4 ns. Hence, the overhead which may be introduced by arbitration is relatively small. In particular, the maximum possible delay may be: max_delay=(number of related blocks−1)*event_duration). On-chip power connections are usually shared by only two adjacent blocks 301-306 at most. Hence, the maximum overhead introduced may be as small as 1-4 ns+tlogic, where tlogic is the overhead delay introduced by the arbitration circuit (i.e. by the control unit 310).

The arbitration typically only occurs for blocks 301-306 that share the same supply parasitics 110, 115. This means that in the example of FIG. 3, blocks 303 and 301 are independent from each other, but both depend on block 302, while block 302 depends on block 301 and on block 303. The dependency is always reciprocal, i.e. if a block x depends on a block y, block y also depends on block x.

Figure 4:
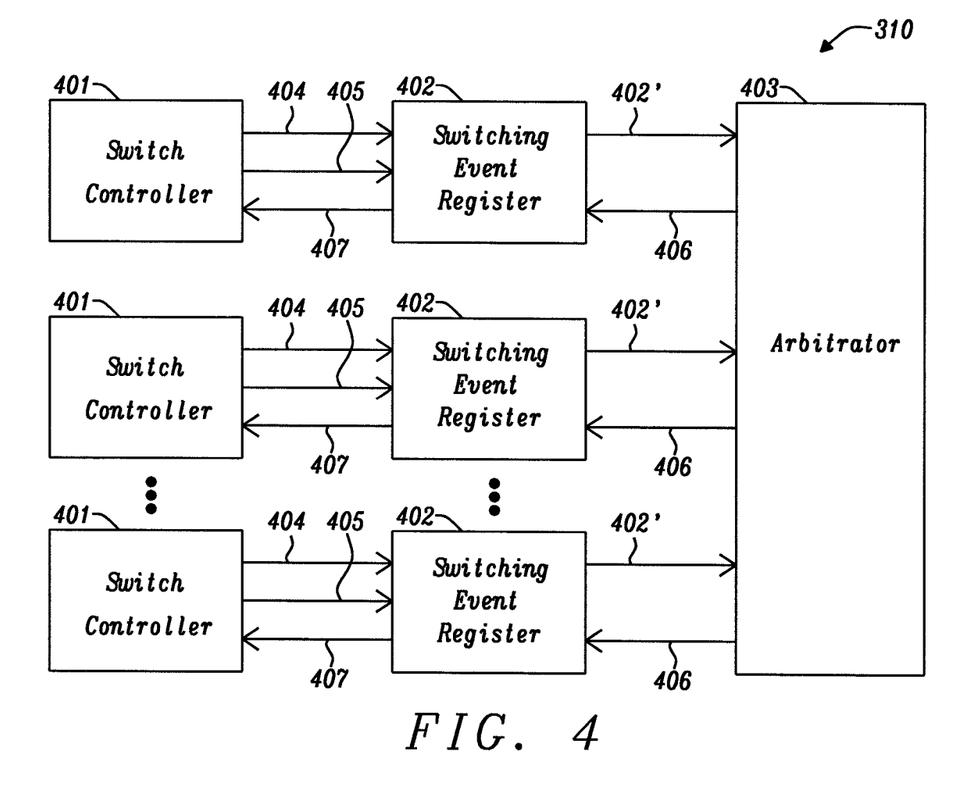
FIG. 4 illustrates an example control unit for controlling the switching events of a plurality of converter blocks.

FIG. 4 shows an example of an arbitrator block diagram implemented e.g. within a control unit 310. A switch controller 401 of a block 301-306 requests a switching edge or event to the switching event register 402 of the respective block 301-306 (messages 404, 405, indicating also the edge type). Based on the edge type, the switch event register 402 will determine the required slot duration and request the slot to the arbitrator 403 (message 402') which assigns the slot to the requesting block (messages 406, 407) and which blocks any other related switch controllers 401 for the required slot duration. The other switching event registers 402 monitor other switching requests from other blocks 301-306 and hold them back until the arbitrator 403 grants permission.

Hence, a control circuit 310 is described in the present document, which implements an arbitration scheme for switching events of switching converter blocks 301-306 such that blocks 301-306 sharing the same parasitics 110, 115 on one or more supply rails do not perform simultaneous switching events. Switching events can be arbitrated according to the type of switching events, in order to reduce the blocking time which is caused by arbitration. The control circuit 310 may be configured to assign a switching time slot to a switching event (i.e. to a switching edge). Furthermore, the control circuit 310 may be configured to delay a switching event if a relevant switching time slot is already taken, until the next available switching time slot.

As a result of arbitration, the stress caused by simultaneous switching events when sharing the same supply parasitics 110, 115 can be reduced. Furthermore, noise and ringing amplitude on the supply rails can be reduced. In addition, power conversion density and system integrity can be increased. Furthermore, by reducing the stress, crosstalk can be reduced and integration capability can be increased.

Hence, a control unit 310 for a converter circuit 300 comprising a plurality of converter blocks 301, 302, 303, 304, 305, 306 is described. The control unit 310 may comprise a processor. Each converter block 301, 302, 303, 304, 305, 306 may comprise one or more switches 103, 104 which are turned on or off during switching events. A switching event may be related to turning on a switch 103 and/or to turning off a switch 103.

In particular, a converter block 301, 302, 303, 304, 305, 306 (e.g. each one of the plurality of converter blocks) may comprise a first switch 103 which is coupled to a first supply rail (notably for supplying a supply voltage 101) and a second switch 104 which is coupled to a second supply rail (notably for coupling the second switch 104 to a reference voltage 121). The first switch 103 and the second switch 104 (e.g. forming a half bridge) may be turned on and/or turned off in an alternating and mutually exclusive manner.

At least some of the converter blocks 301, 302, 303, 304, 305, 306 may share a common supply rail. By way of example, a first converter block 301 and a second converter block 302 may be coupled to the same supply rail (e.g. for providing the supply voltage 101 or the reference voltage 121). The dependencies between the different converter blocks may be indicated by a dependency map, wherein the dependency map may indicate pairs of converter blocks from the plurality of converter blocks 301, 302, 303, 304, 305, 306 that share a common supply rail (e.g. as shown in Table 1).

A supply rail may exhibit an inductance 110, 115, notably a parasitic inductance. By way of example, a supply rail may be coupled to the supply voltage 101 or to the reference voltage 121 (e.g. ground).

The control unit 310 may be configured to determine that a first converter block 301 from the plurality of converter blocks 301, 302, 303, 304, 305, 306 requests a switching event at a first time instant. By way of example, the control unit 310 may be configured to control operation of the one or more switches 103, 104 of first converter block 301 (and of the one or more other converter blocks). In this context, the control unit 310 may be configured to determine the first time instant for a switching event of the first converter block 301 based on a target voltage and/or a target current at an output of the first converter block 301. Alternatively, or in addition, the control unit 310 may be configured to determine the first time instant for a switching event of the first converter block 301 based on an indication of an actual voltage and/or an actual current at the output of the first converter block 301. In particular, the control unit 310 may be configured to determine the first time instant for a switching event of the first converter block 301 based on a control scheme for controlling or setting or regulating the actual voltage and/or the actual current at the output of the first converter block 301 to the target voltage and/or the target current at the output of the first converter block 301. Hence, the first time instant may be the result of a control scheme which is performed by the first converter block 301 (e.g. to regulate the output voltage and/or output current to a target voltage and/or target current).

Furthermore, the control unit 310 may be configured to determine whether the second converter block 302 from the plurality of converter blocks 301, 302, 303, 304, 305, 306, with which the first converter block 301 shares a common supply rail, has a reserved switching time slot for a switching event at the first time instant. In other words, it may be determined, whether or not a switching time slot (which includes the first time instant) has already been reserved for the second converter block 301. For this purpose, the control unit 310 may comprise a storage element for storing a time slot table, that indicates the switching time slots which have already been assigned to each one of the plurality of converter blocks (notably to each one of the converter blocks that share a common supply rail with another one of the converter blocks).

Furthermore, the control unit 310 may be configured to delay the switching event of the first converter block 301 to a time instant subsequent to the reserved switching time slot, if it is determined that the second converter block 302 has a reserved switching time slot at the first time instant. In addition, the control unit 310 may be configured to reserve a switching time slot at the first time instant for the first converter block 301 and/or to assign a switching time slot at the first time instant to the first converter block 301, if it is determined that the second converter block 302 does not have a reserved switching time slot at the first time instant.

Overall, the control unit 310 may be configured to assign switching time slots for switching events to the plurality of converter blocks 301, 302, 303, 304, 305, 306 such that converter blocks 301, 302, 303, 304, 305, 306 sharing a common rail do not exhibit simultaneous switching events (at least switching events of the same event type). In particular, the control unit 310 may be configured to assign switching time slots for switching events to the plurality of converter blocks 301, 302, 303, 304, 305, 306 such that converter blocks 301, 302, 303, 304, 305, 306 sharing a common rail do not draw or sink current from or to the common rail simultaneous. Furthermore, it may be achieved that the switching events (with the same event type) of converter blocks sharing a common supply rail exhibit a minimum time distance from one another. The minimum distance may depend on the duration 241 of a switching event. By way of example, the minimum distance may be one time or two times the duration 241 or more.

By avoiding simultaneous switching events (of the same event type), the stress incurred by the converter blocks 301, 302, 303, 304, 305, 306 may be decreased, thereby increasing the reliability of the converter circuit 300.

The control unit 310 may be configured to determine whether any converter block 302 from the plurality of converter blocks 301, 302, 303, 304, 305, 306 that the first converter block 301 shares a common supply rail with has a reserved switching time slot for a switching event at the first time instant. Furthermore, the control unit 310 may be configured to assign a switching time slot at the first time instant to the first converter block 301, (notably only) if it is determined that none of the converter blocks 302 that the first converter block 301 shares a common supply rail with has a reserved switching time slot for a switching event at the first time instant. Alternatively, or in addition, the control unit 310 may be configured to assign a switching time slot to the first converter block 301, which is subsequent to the reserved switching time slots of the one or more converter blocks 302 that the first converter block 301 shares a common supply rail with and that already have a reserved switching time slot for a switching event at or subsequent to the first time instant. By doing this, it can be ensured in an efficient and reliable manner that converter blocks that share a common supply rail do not perform switching events (of the same event type) simultaneously.

Hence, the control unit 310 may be configured to assign exclusive switching time slots for switching events (notably for switching events of the same type) to converter blocks 301, 302, 303, 304, 305, 306 sharing a common rail. The switching time slots may be assigned according to the order of requested time instants for the switching events. In particular, switching time slots may be assigned sequentially according to the requested time instants for the switching events. By doing this, the overall delay of switching events may be reduced, thereby reducing the impact of delaying switching events on the operations of the one or more converter blocks, notably the impact with regards to regulation.

The control unit 310 may be configured to determine the type of switching event (i.e. the event type) from a plurality of different types of switching events, which is requested by the first converter block 301. Furthermore, the control unit 310 may be configured to determine the type of switching event from the plurality of different types of switching events that the second converter block 302 has a reserved switching time slot for.

The plurality of different types of switching events may comprise a first type which leads to an increase of current on the common supply rail that is shared with the second converter block 302. In other words, a first type of switching event may be a switching event which leads to an increase of the current that is drawn from or sunk to the common supply rail. Furthermore, the plurality of different types of switching events may comprise a second type which leads to a decrease of current on the common supply rail that is shared with the second converter block 302. In other words, a second type of switching event may be a switching event which leads to a decrease of the current that is drawn from or sunk to the common supply rail.

The control unit may be configured to delay the switching event of the first converter block 301 if, notably only if, the event types for the switching events of the first converter block 301 and of the second converter block 302 are the same. In other words, a delay of the switching event of the first converter block 301 may only occur, if the switching event of the second converter block 302 also leads to an increase or alternatively to a decrease of the current which is drawn from or sunk to the common supply rail. In yet other words, a delay of the switching event of the first converter block 301 may only occur if the switching events of the first converter block 301 and of the second converter block 302 cause the same type of stress to the common supply rail. Otherwise, the control unit may refrain from delaying the switching event of the first converter block 301. By doing this, the number of instances that switching events are delayed may be reduced, thereby reducing the impact of the switching event arbitration scheme onto the operations of the converter blocks.

The control unit 310 may be configured to determine that the first converter block 301 requests a switching event of the first event type at the first time instant. Furthermore, the control unit 310 may be configured to determine that the second converter block 302 requests a switching event of the second event type at the second time instant, wherein the first and second types of switching events are different from one another. In particular, the control unit 310 may be configured to determine that two converter blocks 301, 302 sharing a common supply rail request switching events which are complementary to one another and/or which cause complementary stress to the common supply rail.

The control unit 310 may be further configured to assign the same switching time slot or at least partially overlapping switching time slots for the switching events of the first converter block 301 and the second converter block 302. In particular, the control unit 310 may be configured to move the switching events of the first and second converter blocks 301, 302 closer to one another, notably such that the complementary effects of the switching events onto the common supply rail compensate each other at least partially. By doing this, the stress which is caused by the switching events of converter blocks 301, 302 may be decreased further.

The control unit 310 may be configured to determine that the first time instant and the second time instant are apart from one another by a pre-determined gap time or less. The pre-determined gap time may e.g. two times or only one time the duration 241 of a switching time slot. Furthermore, the control unit 310 may be configured to assign the same switching time slot or at least partially overlapping switching time slots for the switching events of the first converter block 301 and the second converter block 302 only if it is determined that the first time instant and the second time instant are apart from one another by the pre-determined gap time or less. In other words, the complementary time switching events may only be moved closer to one another, if the initially requested time instants for the switching events are sufficiently close to one another, thereby limiting the average delay of switching time instants and the average impact on the operations of the converter blocks.

The control unit 310 may be configured to determine the one or more converter blocks from the plurality of converter blocks 301, 302, 303, 304, 305, 306 that the first converter block 301 shares a common supply rail with, using a dependency map, which indicates pairs of converter blocks from the plurality of converter blocks 301, 302, 303, 304, 305, 306 that share a common supply rail. The dependency map may be stored in a storage element of the control unit 310. By making use of a dependency map, interdependencies between converter blocks may be defined and determined in a reliable and flexible manner.

The control unit 310 may be configured to determine the duration 241 of a switching event. Furthermore, the control unit 310 may be configured to reserve a switching time slot for the switching event in accordance with the determined duration 241 of the switching event. By taking into account the (average) duration 241 of switching events when defining the duration of reserved switching time slots, the stress incurred by switching events may be reduced in a reliable manner.

Figure 5:
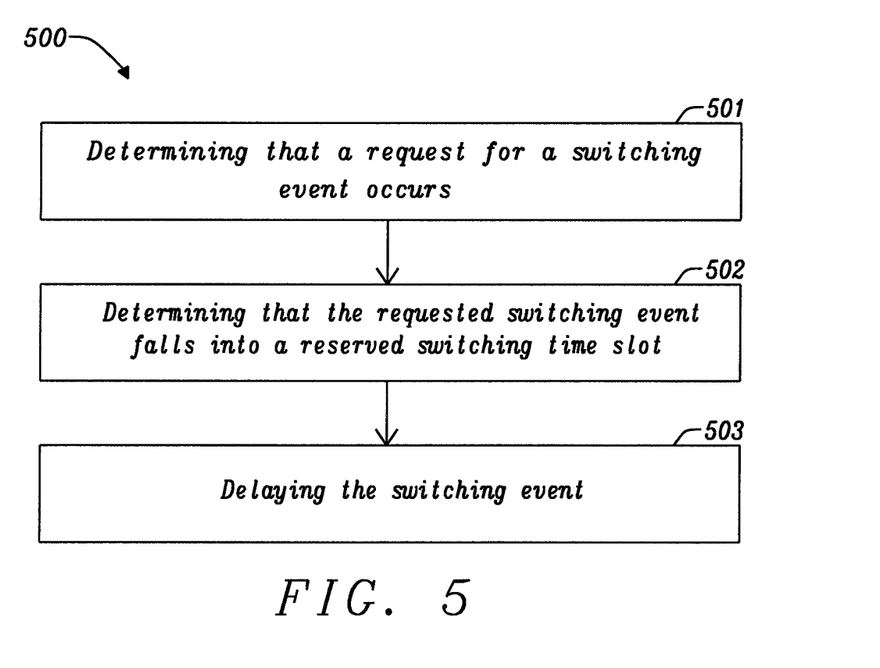
FIG. 5 shows a flow chart of an example method for controlling the switching events of a plurality of converter blocks.

FIG. 5 shows a flow chart of an example method 500 for controlling a converter circuit 300 comprising a plurality of converter blocks 301, 302, 303, 304, 305, 306. Each converter block 301, 302, 303, 304, 305, 306 may comprise one or more switches 103, 104 which are turned on or off during switching events. At least some of the converter blocks 301, 302, 303, 304, 305, 306 may share a common supply rail.

The method 500 comprises determining 501 that a first converter block 301 from the plurality of converter blocks 301, 302, 303, 304, 305, 306 requests a switching event at a first time instant. Furthermore, the method 500 comprises determining 502 whether a second converter block 302 from the plurality of converter blocks 301, 302, 303, 304, 305, 306, with which the first converter block 301 shares a common supply rail, has a reserved switching time slot at the first time instant for a switching event. In addition, the method 500 comprises delaying 503 the switching event of the first converter block 301 to a time instant subsequent to the reserved switching time slot, if it is determined that the second converter block 302 has a reserved switching time slot at the first time instant.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A control unit for a power converter circuit comprising a plurality of converter blocks; wherein each converter block comprises one or more switches which are turned on or off during switching events; wherein at least some of the converter blocks share a common supply rail; wherein the control unit is configured to provide a switching arbitration control scheme between switches of the converter blocks by adding a time margin between switching events of dependent converter blocks, wherein the control unit is further configured to
    determine that a first converter block from the plurality of converter blocks requests a switching event at a first time instant;
    determine whether a second converter block, from the plurality of converter blocks with which the first converter block shares a common supply rail, has a reserved switching time slot at the first time instant for a switching event; and
    delay the switching event of the first converter block to a time instant subsequent to the reserved switching time slot, if it is determined that the second converter block has a reserved switching time slot at the first time instant.

2. The control unit of claim 1, wherein the control unit is configured to reserve a switching time slot at the first time instant for the first converter block and/or to assign a switching time slot at the first time instant to the first converter block, if it is determined that the second converter block does not have a reserved switching time slot at the first time instant.

3. The control unit of claim 1, wherein the control unit is configured to
    determine whether any converter block from the plurality of converter blocks that the first converter block shares a common supply rail with has a reserved switching time slot for a switching event at the first time instant;
    assign a switching time slot at the first time instant to the first converter block, if it is determined that none of the converter blocks that the first converter block shares a common supply rail with has a reserved switching time slot for a switching event at the first time instant; and/or
    assign a switching time slot to the first converter block which is subsequent to the reserved switching time slots of the one or more converter blocks that the first converter block shares a common supply rail with and which already have a reserved switching time slot for a switching event at or subsequent to the first time instant.

4. The control unit of claim 1, wherein the control unit is configured to assign switching time slots for switching events to the plurality of converter blocks such that converter blocks sharing a common rail do not exhibit simultaneous switching events.

5. The control unit of claim 1, wherein the control unit is configured to assign exclusive switching time slots for switching events to converter blocks sharing a common rail according to an order of requested time instants for the switching events.

6. The control unit of claim 1, wherein the control unit is configured to
    determine a type of switching event from a plurality of different types of switching events, which is requested by the first converter block;
    determine the type of switching event from the plurality of different types of switching events that the second converter block has a reserved switching time slot for; and
    delay the switching event of the first converter block only if, the types of switching event for the switching events of the first converter block and of the second converter block are the same.

7. The control unit of claim 6, wherein the plurality of different types of switching events comprises
    a first type which leads to an increase of current on the common supply rail which is shared with the second converter block; and
    a second type which leads to a decrease of current on the common supply rail which is shared with the second converter block.

8. The control unit of claim 6, wherein the control unit is configured to
    determine that the first converter block requests a switching event of a first type at the first time instant;
    determine that the second converter block requests a switching event of a second type at the second time instant; wherein the first and second types of switching events are different from one another; and assign the same switching time slot, or at least partially overlapping switching time slots, for the switching events of the first converter block and the second converter block.

9. The control unit of claim 8, wherein the control unit is configured to
determine that the first time instant and the second time instant are apart from one another by a pre-determined gap time or less; and
assign the same switching time slot or at least partially overlapping switching time slots for the switching events of the first converter block and the second converter block only if it is determined that the first time instant and the second time instant are apart from one another by the pre-determined gap time or less than the predetermined gap time.

10. The control unit of claim 1, wherein the control unit is configured to determine the one or more converter blocks from the plurality of converter blocks that the first converter block share a common supply rail with, using a dependency map, which indicates pairs of converter blocks from the plurality of converter blocks that share a common supply rail.

11. The control unit of claim 1, wherein the control unit is configured to
determine a duration of a switching event; and
reserve a switching time slot for the switching event in accordance with the determined duration of the switching event.

12. The control unit of claim 1, wherein
a converter block comprises a first switch coupled to a first supply rail and a second switch coupled to a second supply rail; and
the first switch and the second switch are turned on in an alternating and mutually exclusive manner.

13. The control unit of claim 1, wherein the control unit is configured to
determine the first time instant for a switching event of the first converter block based on a target voltage and/or a target current at an output of the first converter block; and/or
determine the first time instant for a switching event of the first converter block based on an indication of an actual voltage and/or an actual current at the output of the first converter block; and/or
determine the first time instant for a switching event of the first converter block based on a control scheme for regulating the actual voltage and/or the actual current at the output of the first converter block to the target voltage and/or the target current at the output of the first converter block.

14. The control unit of claim 1, wherein
a supply rail exhibits an inductance, notably a parasitic inductance; and/or
a supply rail is coupled to a supply voltage or to a reference voltage.

15. A method for controlling a power converter circuit comprising a plurality of converter blocks; wherein each converter block comprises one or more switches which are turned on or off during switching events; wherein at least some of the converter blocks share a common supply rail; the method comprising providing a switching arbitration control scheme between switches of the converter blocks by adding a time margin between switching events of dependent converter blocks, wherein the method further comprises
determining that a first converter block from the plurality of converter blocks requests a switching event at a first time instant;
determining whether a second converter block from the plurality of converter blocks, with which the first converter block shares a common supply rail, has a reserved switching time slot for a switching event at the first time instant; and
delaying the switching event of the first converter block to a time instant subsequent to the reserved switching time slot, if it is determined that the second converter block has a reserved switching time slot at the first time instant.

16. The method of claim 15, further comprising reserving a switching time slot at the first time instant for the first converter block and/or assigning a switching time slot at the first time instant to the first converter block, if it is determined that the second converter block does not have a reserved switching time slot at the first time instant.

17. The method of claim 15, further comprising
determining whether any converter block from the plurality of converter blocks that the first converter block shares a common supply rail with has a reserved switching time slot for a switching event at the first time instant;
assigning a switching time slot at the first time instant to the first converter block, if it is determined that none of the converter blocks that the first converter block shares a common supply rail with has a reserved switching time slot for a switching event at the first time instant; and/or
assigning a switching time slot to the first converter block which is subsequent to the reserved switching time slots of the one or more converter blocks that the first converter block shares a common supply rail with and which already have a reserved switching time slot for a switching event at or subsequent to the first time instant.

18. The method of claim 15, further comprising assigning switching time slots for switching events to the plurality of converter blocks such that converter blocks sharing a common rail do not exhibit simultaneous switching events.

19. The method of claim 15, further comprising assigning exclusive switching time slots for switching events to converter blocks sharing a common rail according to an order of requested time instants for the switching events.

* * * * *